United States Patent
Pyle

[11] 3,812,988
[45] May 28, 1974

[54] BOAT TRANSPORTING, LAUNCHING AND RETRIEVING TRAILER

[76] Inventor: John A. Pyle, Rt. 1, Box 143, Hartly, Del. 19953

[22] Filed: Dec. 6, 1972

[21] Appl. No.: 312,731

[52] U.S. Cl. ................................. 214/505, 214/84
[51] Int. Cl. ............................................. B60p 3/10
[58] Field of Search ............. 214/505, 506, 84, 517

[56] References Cited
UNITED STATES PATENTS

| | | | |
|---|---|---|---|
| 2,485,300 | 10/1949 | Lisota | 214/505 |
| 3,021,969 | 2/1962 | Peake et al. | 214/84 |
| 3,043,458 | 7/1962 | Klosk et al. | 214/505 |
| 3,414,148 | 12/1968 | Bishop | 214/505 |
| 3,447,815 | 6/1969 | West | 214/84 X |

*Primary Examiner*—Albert J. Makay
*Attorney, Agent, or Firm*—B. P. Fishbourne, Jr.

[57] ABSTRACT

A trailer for transporting, launching and retrieving relatively large boats features a wheeled carriage adapted for coupling to a towing vehicle. A boat supporting bed or frame is both pivotally and longitudinally movably mounted on the wheeled carriage and is tilted and longitudinally extended and retracted relative to the carriage by a pair of fluid pressure operated cylinders which have independent controls. The cylinder which controls the longitudinal extension and retraction of the boat supporting bed pivots with the bed but remains attached to the wheeled carriage and has sliding engagement with support means on the bed so that the cylinder will be properly aligned during the exceptionally long stroke of its piston rod. A third independently controlled cylinder operates boat centering guide arms at the rear of the support bed which are activated during retrieval of the boat from the water. Conveniently located controls for the three cylinders and a boat loading and unloading winch permit an operator to select the correct pivotal and longitudinal movements of the boat supporting bed in conjunction with winch control to meet all variable boat launching and retrieval terrain conditions.

18 Claims, 15 Drawing Figures

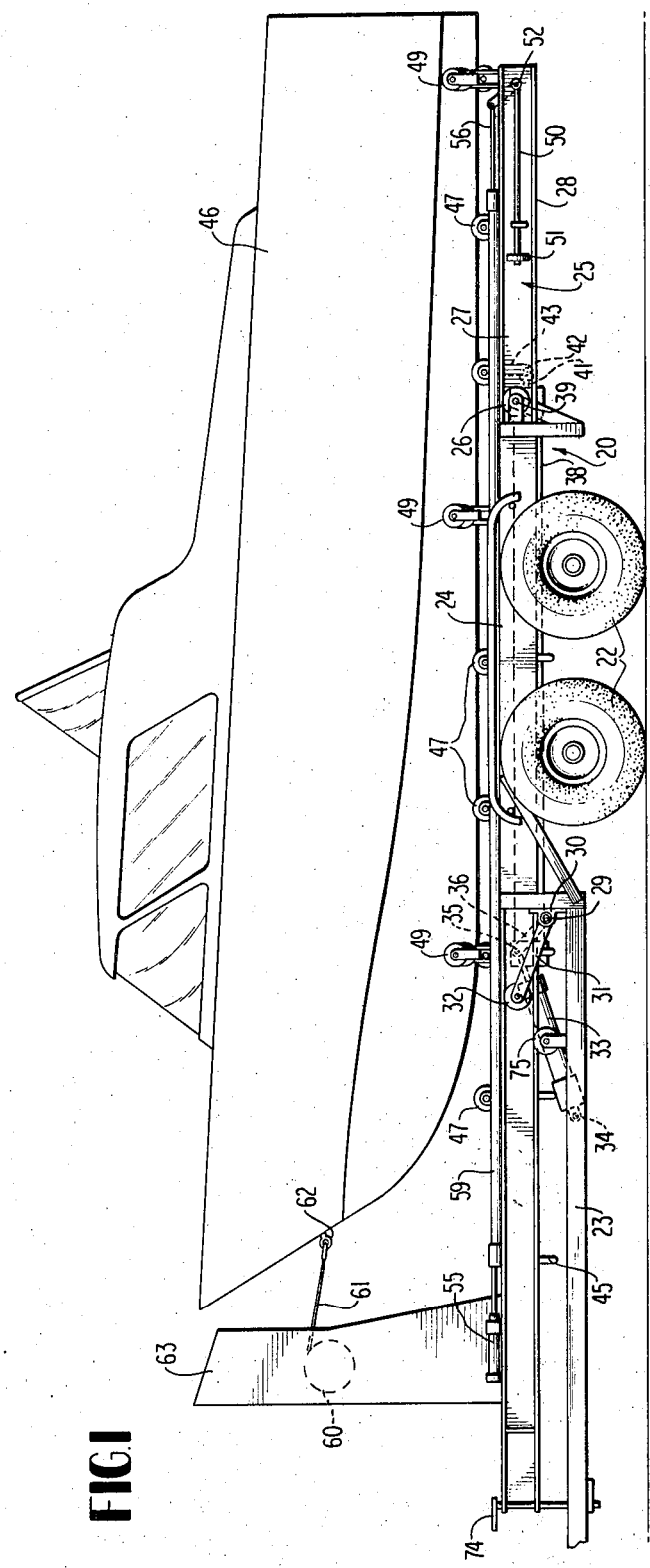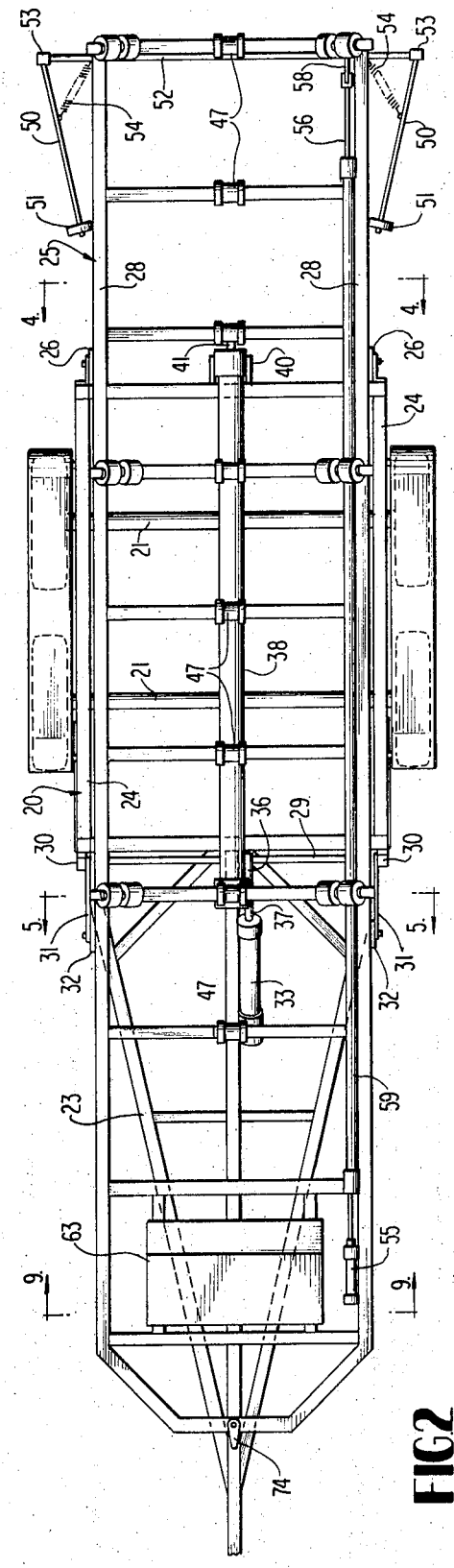
FIG.1
FIG.2

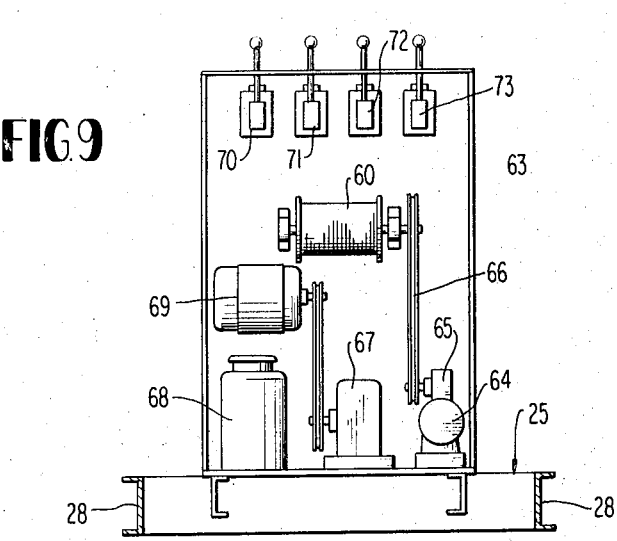
FIG.9
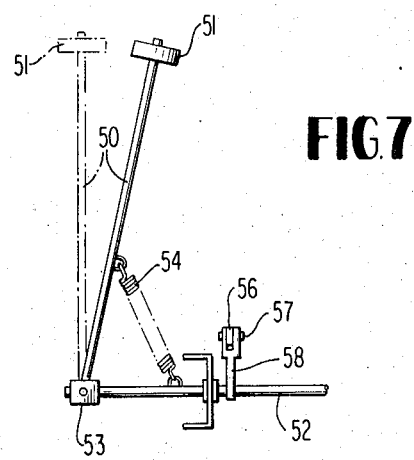
FIG.7
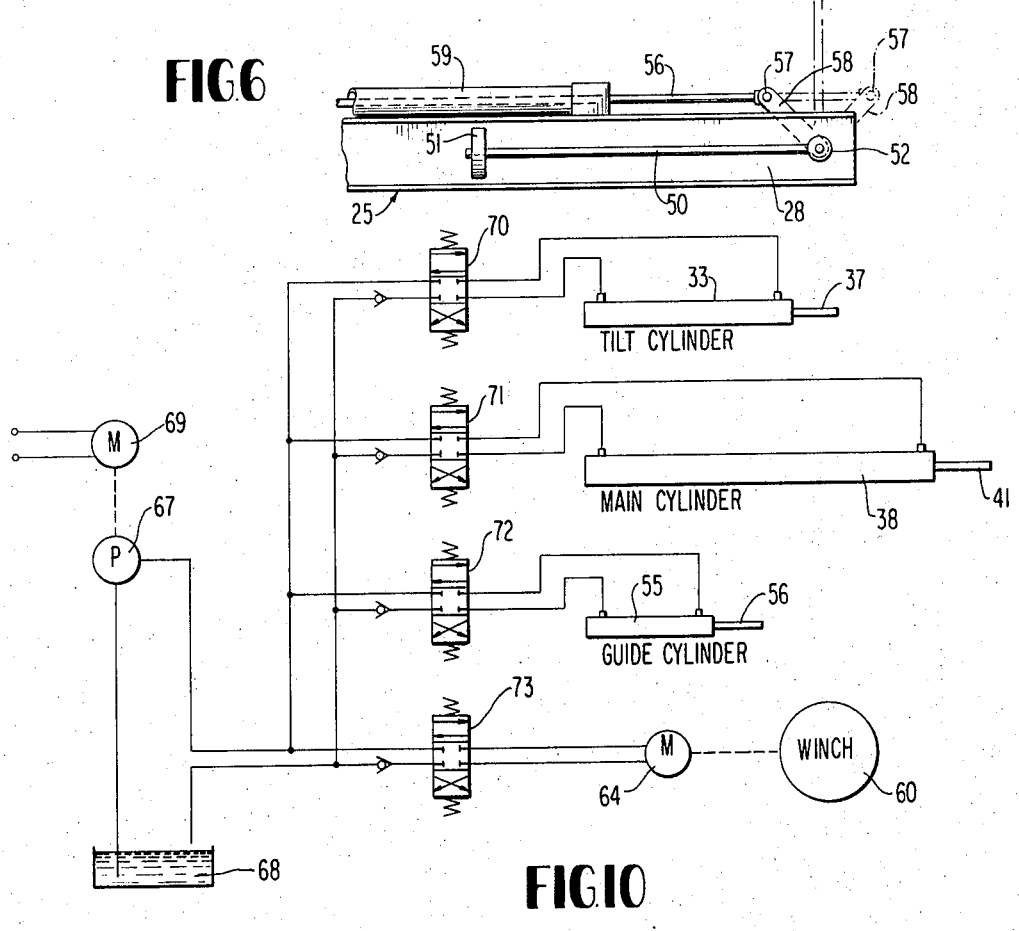
FIG.6
FIG.10

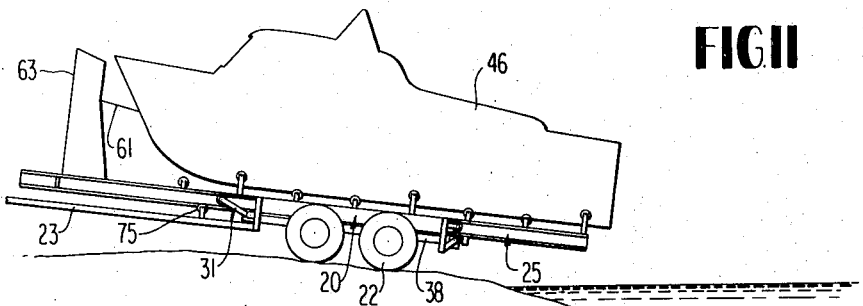
FIG.11
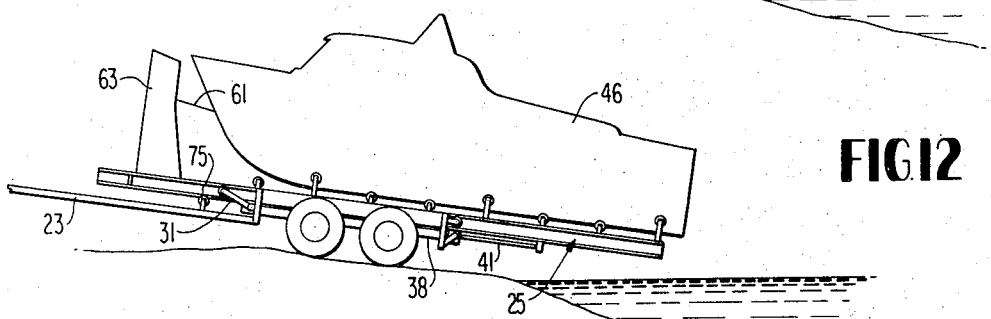
FIG.12
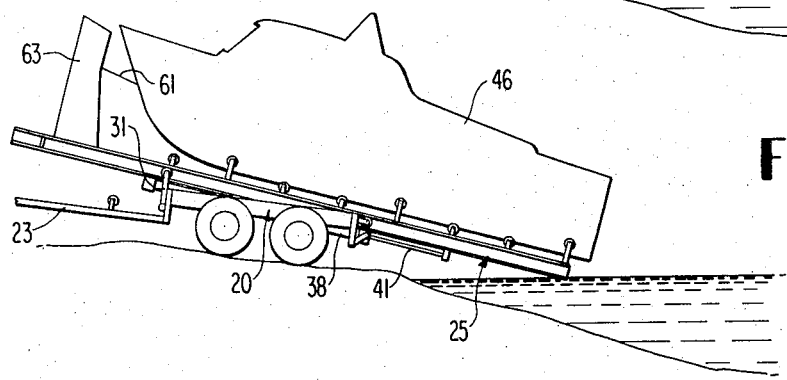
FIG.13
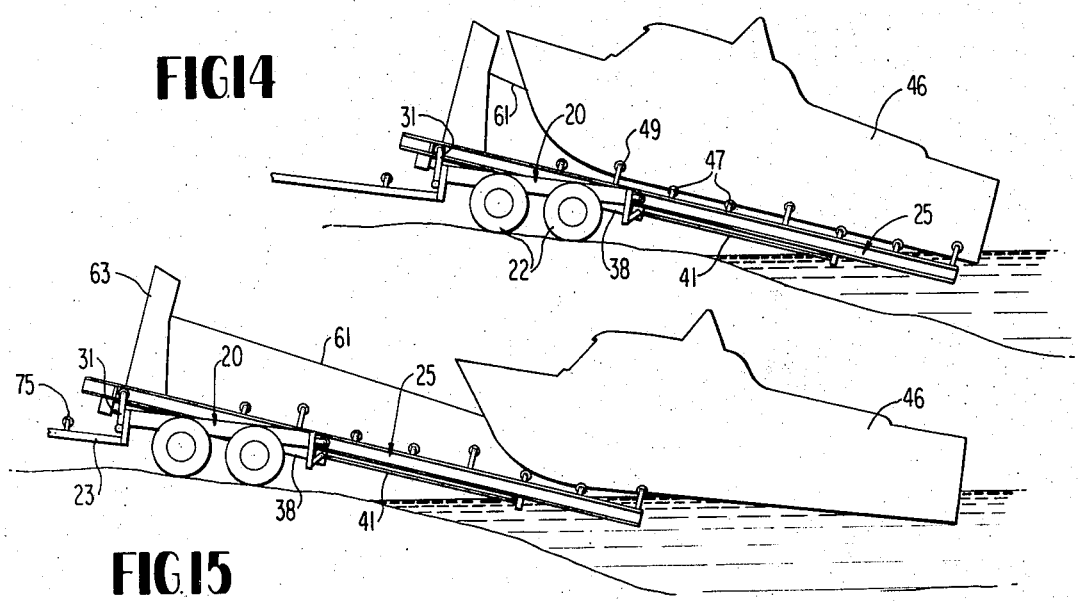
FIG.14
FIG.15

BOAT TRANSPORTING, LAUNCHING AND RETRIEVING TRAILER

BACKGROUND OF THE INVENTION

With the increasing popularity of larger-size cabin cruisers and other boats of sufficient size to accommodate families, there is a need for compatible transporting, launching and loading or retrieval equipment which can be readily towed by an automobile or pick-up truck. Conventional boat trailers which can be legally towed on Federal and State highways generally do not possess the capability of conveniently launching and retrieving larger boats without danger of costly damage to the boat and to the transporting equipment. Much inconvenience can occur where inadequate trailers are backed up into the water during makeshift launching procedures and become deeply mired in the mud or sand. Conventional trailers with tilting beds generally lack the necessary range of movements required for the successful launching and loading of larger boats. Also, the trailers customarily used today lack power controls and actuators and are generally lightweight and rely on manual winches and linkages which simply are not adequate to handle large cabin cruisers and the like.

Accordingly, the aim of this invention is to completely satisfy this need in the art through the provision of a trailer particularly adapted to handle large boats including the safe transportation thereof on highways behind automotive vehicles and the efficient launching and retrieval of the boats from various bodies of water having a variety of approach terrain conditions.

In accordance with the invention, a single operator or user of the equipment can easily transport the largest size boat on public highways and upon reaching the desired water site can conveniently launch the boat or load the same without any assistance from others and entirely without physical effort. The apparatus may be powered from the electrical system of the towing vehicle or, if preferred, by a small engine on the trailer unit. In either case, convenient and independent hydraulic controls for the winch and each of the three hydraulic cylinders embodied in the apparatus are in ready reach of the operator as he stands near the forward end of the apparatus. By manipulating the controls, the operator ordinarily need not even leave his control station during the tilting and extending or retracting of the boat supporting bed and the conjoint operation of the winch and power-operated retrieval guide arms. The large size boat may be safely launched or retrieved even in situations where space is cramped and the beach terrain is uneven or steep. The wheeled carriage of the equipment need not be backed into the water and the wheels may remain on dry land so that the equipment will never be mired or stuck.

The invention possesses additional features and advantages which will become apparent to those skilled in the art during the course of the following detailed description.

BRIEF DESCRIPTION OF DRAWINGS

FIG. 1 is a side elevation of a boat trailer embodying the invention and showing a relatively large size boat resting thereon in position to be moved on a highway.

FIG. 2 is a plan view of the invention with the boat omitted.

FIG. 6 is a fragmentary side elevation of a guiding mechanism used primarily in the retrieval or loading of a boat onto the trailer.

FIG. 7 is a fragmentary rear elevational view of the power-operated guide mechanism.

FIG. 9 is a partly diagrammatic elevational view of a control console and components.

FIG. 10 is a schematic view of the hydraulic control circuit for the three primary power cylinders utilized on the trailer.

FIGS. 11 to 15 inclusive are partly diagrammatic side elevational views of a sequence of steps followed in the launching of a heavy boat in water at the site of a steep beach or river bank.

DETAILED DESCRIPTION

Figure 4:
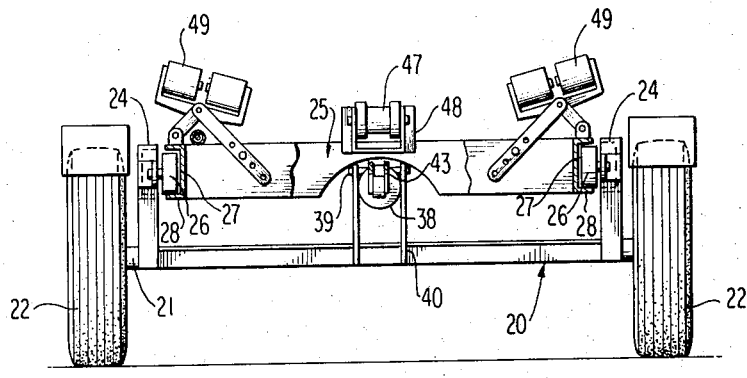
FIG. 4 is an enlarged transverse vertical section taken on line 4—4 of FIG. 2.

Referring to the drawings in detail wherein like numerals designate like parts, the numeral 20 designates a wheeled carriage of sturdy construction, preferably having a pair of transverse axles 21 arranged in tandem and carrying pairs of pneumatic tired wheels 22, as shown. At its forward end, the wheeled carriage 20 has a horizontal rigid tongue extension 23 of adequate length to be coupled in any conventional manner to the towing hitch mechanism of an automobile, pick-up truck or the like, not shown. As clearly indicated in the drawings, the tongue extension 23 is arranged at a lower elevation than the two main side members 24 of the wheeled carriage and the reason for the elevation of the members 24 will be further explained hereinafter. The other constructional details of the wheeled carriage 20 including the cross-bracing thereof may be conventional and are not important to a full understanding of the invention.

The trailer apparatus further comprises a tiltable and longitudinally shiftable boat support bed or frame 25 of very rigid construction so as to be capable of supporting relatively large size boats. As shown in FIG. 2, the support bed 25 is approximately rectangular and is elongated and is adapted to be positioned between the two side members 24 of the wheeled carriage 20. By virtue of this arrangement, when the bed 25 is retracted and in the level position for highway transit, FIG. 1, the top of the bed 25 is substantially flush with the tops of the side members 24 of carriage 20.

The bed or frame 25 is pivoted to the wheeled carriage 20 for vertical swinging relative thereto by a pair of heavy duty pivot rollers 26 which are rigidly attached by suitable bracket means to the rear ends of the carriage side members 24. These pivot rollers engage within trackways 27 afforded by the outwardly opening channel formation of the main longitudinal side members 28 of the bed 25. The rollers 26 serve not only as pivot points for the vertically swingable bed 25 but also as a means to guide the same with minimum friction during its longitudinal movements fore and aft.

In order to control the vertical swinging or tilting of the bed 25 without manual effort, a rocker shaft 29 extends transversely across the front of the carriage 20 and is rotatably supported thereon by suitable bearings 30. A pair of crank arms 31, rigid with the rocker shaft 29 near the opposite ends thereof, lie immediately outwardly of the bed side members 28 and carry heavy duty guide rollers 32 similar or identical to the rollers 26. The guide rollers 32 likewise engage in the trackways 27 of the channel members 28, as clearly shown in FIG. 5. A power actuator preferably in the form of a hydraulic cylinder 33 is disposed near the transverse center of the trailer with its cylinder end pivoted at 34 to the tongue portion 23 of wheeled carriage 20 and its rod end pivotally attached at 35 to an additional crank arm 36 rigidly secured to the rocker shaft 29 near its longitudinal center. The power cylinder 33 is extended or retracted by the operation of remotely located control means, to be described. Suffice it to say here that extension of the piston rod 37 of this cylinder will swing the crank arms 31 upwardly toward their dotted line positions shown in FIG. 3 to correspondingly tilt the forward end of the bed 25 upwardly with the bed pivoting on the pair of pivot rollers 26. When the piston rod 37 is retracted, the bed 25 will be returned automatically to its level position shown in full lines in FIG. 3. This pivotal movement of the heavy bed will take place smoothly and without sudden jarring under full control of the power means without manual effort, as will be further explained.

A separate power means is provided to shift the bed 25 longitudinally the required distances for launching a relatively large boat. This power means preferably comprises a single long hydraulic cylinder 38 at the transverse center of the trailer, having a piston rod stroke of up to seven feet approximately. The long cylinder 38 is pivoted at its rod end, FIG. 4, on a transverse pivot element 39 supported on a bracket means 40 rigid with the frame of undercarriage 20. The pivot element 39 is coaxially aligned with the pivot rollers 26 for the bed 25 so that the bed and the cylinder 38 may swing vertically in unison on the same pivot axis.

Figure 3:
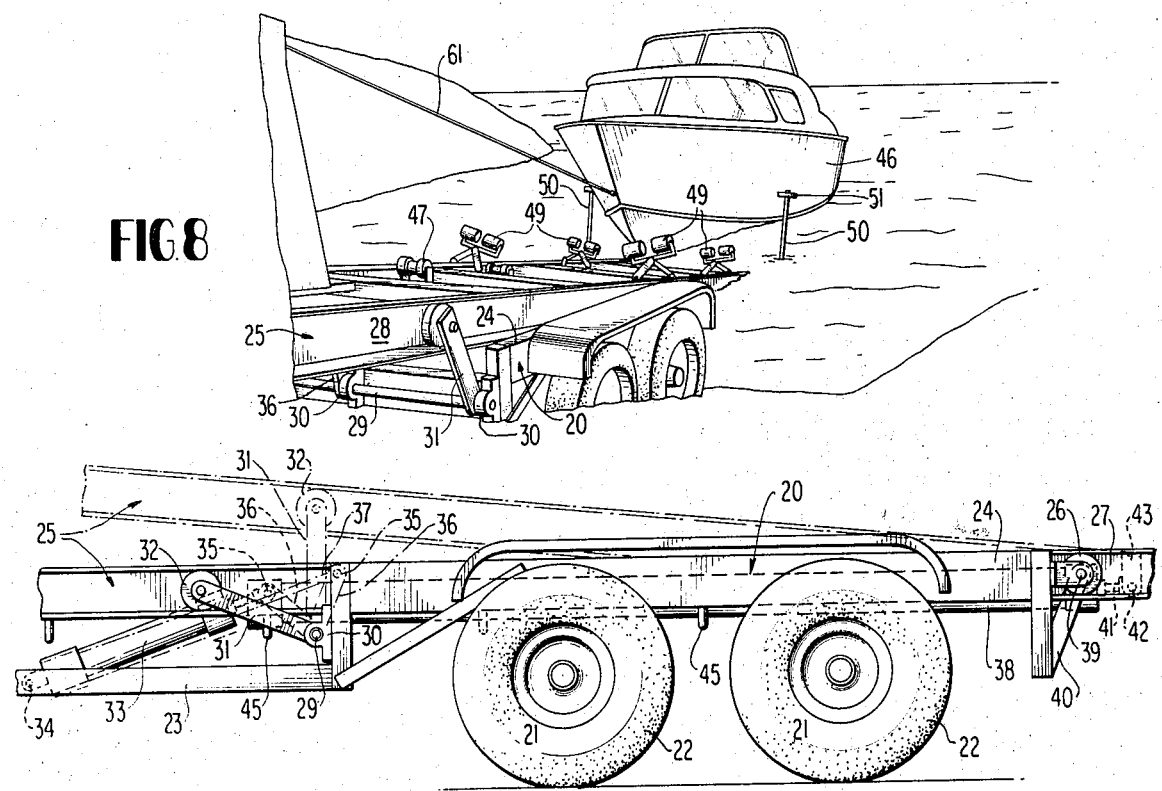
FIG. 3 is an enlarged fragmentary side elevation of the trailer illustrating the manner in which the boat supporting bed is tilted by power means.

The piston rod 41 of long cylinder 38 is pivotally attached at 42 to a depending bracket 43 on the movable bed 25, FIG. 3, and therefore longitudinal extension or retraction of the piston rod 41 by remote control means, to be described, will shift the entire bed 25 smoothly forwardly or rearwardly with minimum friction and without manual effort as the bed is supported and guided by the pairs of rollers 26 and 32. By actuating the two cylinders 33 and 38 independently and by different amounts, the attitude of the bed 25 as to degree of tilting and longitudinal adjustment may be varied widely by the operator so that all of the necessary positions of the bed for successful launching or retrieval of a boat in varying conditions may be obtained.

Figure 5:
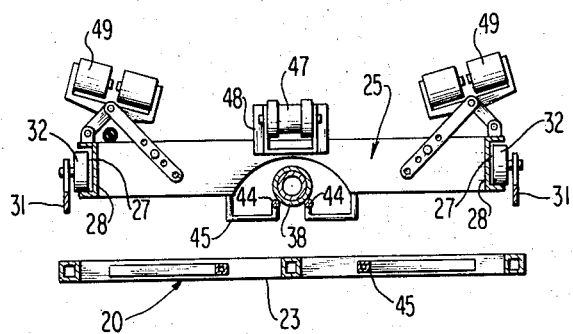
FIG. 5 is a similar section taken on line 5—5 of FIG. 2.

In order to further support and maintain the alignment of the long cylinder 38 during extension of the piston rod 41 by as much as seven feet in some cases, a pair of spaced longitudinal round cross section support rods 44 engage and cradle the lower part of the cylinder 38 slidably, FIGS. 3 and 5, these support rods being fixedly secured to U-shaped hangers 45, in turn fixedly attached in any suitable manner to the movable bed 25. It will be understood that, as the bed 25 moves rearwardly or forwardly relative to the cylinder 38, the cylinder is restrained against movement except pivotal movement at the pivot element 39. The rods 44, therefore, form a sliding support which will cradle the long cylinder 38 during all longitudinal adjustments of the bed 25. The long cylinder is therefore bodily suspended by these two rods 44 on the movable bed 25 and is further suspended to the pivot element 39 from the wheeled carriage 20.

For the support and guidance of a boat 46, such as a large cabin cruiser, as the same is received on the bed 25 or discharged therefrom by winch means to be described, this bed is equipped at its center with a plurality of longitudinally spaced keel guidance and support rollers 47 journaled on suitable support brackets 48. Self-adjusting laterally opposed pairs of conventional boat cradling rollers 49 are also provided on the movable bed 25 near the opposite sides thereof and on opposite sides of the keel rollers 47. Thus, when the boat 46 is launched or retrieved, it is fully guided and stabilized at all times with respect to the bed 25.

Figure 8:
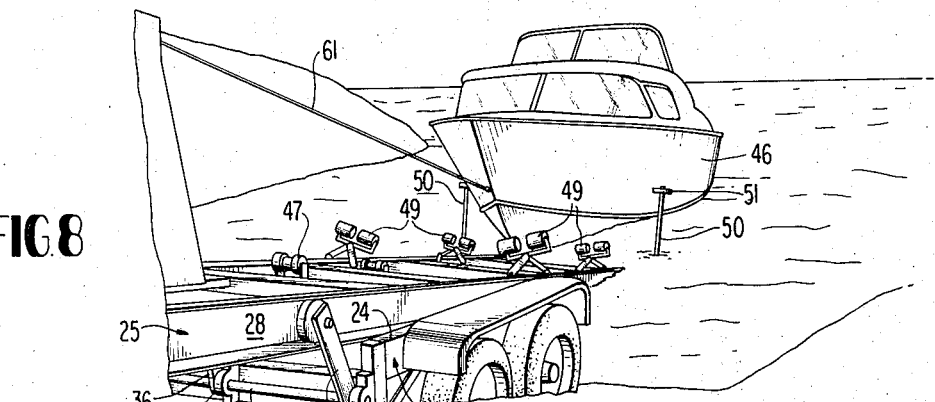
FIG. 8 is a fragmentary perspective view of the invention showing a retrieving or loading operation with the guide or centering mechanism in the active position.

Additional power-operated lateral guidance means for the boat during the retrieval operation is provided in the form of a pair of guide arms 50 equipped with guide rollers 51 for direct contact with the boat hull when the arms are swung to their active positions shown in FIGS. 7 and 8, the stowed position of these arms being shown in FIGS. 1, 2 and 6. The guide arms 50 are secured to a transverse rocker shaft 52 at the rear end of the movable bed 25 to rotate therewith between the stowed and active positions of the guide arms. The arms 50 are further pivotally connected at 53 to the ends of the rocker shaft 52 somewhat outwardly of the bed side members 28, see FIG. 2. The arms 50 are resiliently biased inwardly on their pivots 53 by springs 54 and may move outwardly automatically to solid positions upon contact with the tapered hull of the boat as the latter is winched up onto the bed 25 as depicted in FIG. 8. The solid guidance positions of the two arms 50 are illustrated in FIG. 8 and also in FIG. 7 at the broken line position.

The arms 50 are shifted from the stored or non-use to the active use positions by another remotely controlled power means, preferably in the form of a third relatively small hydraulic cylinder 55, mounted on the bed 25 near the forward end and at one side thereof. The extensible and retractable rod of this power cylinder is extended as shown at 56 for substantially the entire length of the bed 25 and at its rear end is pivotally connected at 57 to a crank arm 58 rigid with the rocker shaft 52. Preferably, although not necessarily, the long control rod 56 is covered throughout most of its length by a stationary sheathing or tube 59 for added safety.

In addition to the three cylinders 33, 38 and 55, the boat trailer is equipped with a power-operated winch drum 60 including cable 61 adapted for attachment to the bow of the boat at 62. The winch drum 60 is mounted rotatably in an upstanding console housing 63 near the forward end of the movable bed 25, sufficient space remaining on the bed ahead of the housing 63 for an operator to stand while using the control console.

Referring to FIG. 9 and schematic FIG. 10, the winch drum 60 is driven preferably by a hydraulic motor 64 having a conventional speed reducer 65 connected by gearing 66 to the winch drum. A hydraulic pump 67 supplied with fluid from a reservoir 68 is driven by an electric motor 69 which may be conveniently connected with the electrical system of the towing vehicle. If preferred, a small gasoline engine may power the pump 67. This same pump supplies the necessary fluid pressure to activate the cylinders 33, 38 and 55 and manually operated conventional four-way hydraulic control valves 70, 71, 72 and 73 are provided in the console housing 63 for the independent and selective control by the operator of the tilt cylinder 63, the carriage shifting cylinder 38, the lateral guide operating cylinder 65 and the winch motor 64. The sinple hydraulic circuit for these operating elements of the apparatus are shown schematically in FIG. 10 in relation to their independent four-way control valves 70, 71, 72 and 73 and the pump 67 common to the valves and power elements 33, 38, 55 and 64. It is thought that the operation of this simple hydraulic system is readily understandable by anyone skilled in the art by a mere inspection of FIG. 10 and that no further detailed description of the control circuit is necessary. Suffice it to say that each power cylinder 33, 38 and 55 may be extended or retracted independently of the other cylinders by a mere shifting of the associated four-way valve. Also, the winch motor 64 may be operated forwardly or rearwardly independently of the cylinders by means of the four-way valve 73. Each valve is shown in FIG. 10 at the neutral position with the associated cylinders and winch in fixed positions.

One other feature of the invention resides in the provision of a safety latching bolt 74 of any preferred type, FIG. 1, to releasably lock the bed 25 to the tongue 23 when the caravan is arranged for road travel.

FIGS. 11 through 15 show a typical sequence of operation involved when launching the large boat 46 from a rather steep bank into a body of water. While these figures to a great extent speak for themselves, the operation may be summarized as follows.

FIG. 11 shows the boat trailer backed up with the wheels 22 close to the water but still on dry land. With the invention it is never necessary for the wheels of the carriage 20 to enter the water. The bed 25 is still arranged in the normal road travel position in FIG. 11.

In FIG. 12, the long cylinder 38 has been activated by use of the valve 71 to move the bed 25 rearwardly somewhat so that the stern of the boat will overhang the water for a considerable distance.

In FIG. 13, while the bed 25 remains locked in the same position shown in FIG. 12, the tilt cylinder 33 is extended by use of the valve 70 to tilt the bed upwardly at the front and downwardly at its rear end to further position the boat for launching. As explained previously, the bed 25 pivots on the two rollers 26 and the cylinder 38 simultaneously pivots on the pivot element 39.

Following this, FIG. 14, the tilt cylinder 33 is locked by the return of its valve 70 to neutral and the long cylinder 38 has its rod 41 further extended by use of the control valve 71 up to a maximum of about seven feet from the mouth of the cylinder 38. This is enough to place the stern of the boat in the water, as shown. The valve 71 may then be returned to neutral to lock the cylinder 38.

Finally, in FIG. 15, with the bed 25 remaining positioned as in FIG. 14, the winch drum 60 is activated with its hydraulic motor 64 by use of the valve 73 and the boat is allowed to roll from the bed 25 into the water smoothly and at the desired rate of speed under control of the cable 61.

In retrieving the boat from the water, a reverse sequence of operations is followed from FIG. 15 back through FIG. 11. However, referring to FIG. 8, as the boat is being winched up onto the tilted bed 25, the lateral guide arms 50 are activated to their use positions by extension of the rod 56 of power cylinder 55 under control of the manual valve 72. When the boat 46 is safely on board the bed 25, the guide arms 50 are returned to their down or stored positions by shifting the four-way valve 72 to the second position.

It should be mentioned that the numeral 75 designates an additional pair of guide rollers on the tongue portion 23 of the wheeled carriage 20 to further support and guide the bed 25 when the latter is level or parallel with the frame of the wheeled carriage.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A trailer for transporting, launching and retrieving a boat comprising a wheeled undercarriage having a draft tongue adapted for connection with a towing vehicle, a boat supporting bed pivotally and longitudinally movably mounted on the undercarriage for vertical swinging movement and fore or aft movement thereon, a first power means interconnecting said undercarriage and bed and operable to tilt the bed vertically on its pivot relative to the undercarriage, a second power means interconnecting the undercarriage and bed and operable to shift the bed longitudinally in opposite directions relative to the undercarriage while the bed is tilted or level or in an intermediate position, a power winch on the trailer having a flexible element attachable to a boat for drawing the boat onto said bed or for delivering the boat from the bed into the water, a pair of laterally spaced guide arms on said bed near the rear end of the bed and having stored and active positions, and another power means on the bed and connected with said guide arms and operable independently of the aforementioned power means to move the guide arms to and from their active and stored positions.

2. The structure of claim 1, and said guide arms carried by a transverse rocker shaft on said bed, said another power means comprising a power cylinder having an extensible and retractable rod, and a crank arm on said rocker shaft connected with said rod.

3. The structure of claim 2, and means forming pivotal connections between the guide arms and said rocker shaft, springs biasing the guide arms laterally inwardly toward each other and the guide arms moving outwardly to solid boat guiding positions responsive to contact with the tapered hull of a boat.

4. The structure of claim 1, and a control console on the trailer having separate remote manually operable controls for said first and second power means, said power winch and said another power means.

5. The structure of claim 4, and said control console mounted on said bed near the forward end of the bed.

6. The structure of claim 5, and said first power means second power means and another power means comprising three independently operable power cylinders and said separate controls including an independently operable control valve for each said power means.

7. The structure of claim 1, and centrally located longitudinally spaced keel guiding and support rollers on said bed, and coacting laterally spaced self-adjusting boat cradling roller units on the bed on opposite sides of said keel rollers.

8. The structure of claim 1, and said first and second power means comprising first and second fluid pressure operated cylinders on said undercarriage having extensible and retractable piston rods and intervening mechanism connected with said bed.

9. The structure of claim 8, and said intervening mechanism including a rocker shaft on the undercarriage extending transversely thereof and having a crank arm connected with the piston rod of said first cylinder, and an additional pair of crank arms on the rocker shaft and having guide rollers thereon movably engaging longitudinal trackways on the opposite sides of said bed.

10. A trailer for transporting, launching and retrieving a boat comprising a wheeled undercarriage having a draft tongue adapted for connection with a towing vehicle, a boat supporting bed pivotally and longitudinally movably mounted on the undercarriage for vertical swinging movement and fore or aft movement thereon, a first power means interconnecting said undercarriage and bed and operable to tilt the bed vertically on its pivot relative to the undercarriage, a second power means interconnecting the undercarriage and bed and operable to shift the bed longitudinally in opposite directions relative to the undercarriage while the bed is tilted or level or in an intermediate position, a power winch on the trailer having a flexible element attachable to a boat for drawing the boat onto said bed or delivering the boat from the bed into water, and said second power means comprising a long longitudinally extending power cylinder pivoted to said undercarriage near its rearward rod end and having a piston rod pivotally connected to said bed, said long cylinder extending for a substantial distance forwardly of its pivotal connection with the undercarriage, and cradle supporting means for said long cylinder secured to said bed and movable therewith and slidably engaging the long cylinder so that the latter will be supported and aligned for all positions of the bed.

11. The structure of claim 10, and the pivotal connection between said bed and undercarriage comprising a pair of guide rollers for the bed on the undercarriage and being coaxial with the pivot of the long power cylinder on the undercarriage.

12. A trailer for transporting, launching and retrieving a boat comprising a wheeled undercarriage having a draft tongue adapted for connection with a towing vehicle, a boat supporting bed pivotally and longitudinally movably mounted on the undercarriage for vertical swinging movement and fore or aft movement thereon, a first power means interconnecting said undercarriage and bed and operable to tilt the bed vertically on its pivot relative to the undercarriage, a second power means interconnecting the undercarriage and bed and operable to shift the bed longitudinally in opposite directions relative to the undercarriage while the bed is tilted or level or in an intermediate position, a power winch on the trailer having a flexible element attachable to a boat for drawing the boat onto said bed or for delivering the boat from the bed into the water, and said first power means including a pair of vertically swingable crank arms mounting a pair of guide rollers which engage opposite side trackways of said bed guidingly and supportingly, and an additional pair of guide and support rollers for said bed rearwardly of the rollers on said crank arms, said additional pair of rollers constituting pivot elements for said bed allowing the bed to be tilted relative to the undercarriage in any longitudinally adjusted position of the bed under influence of the second power means.

13. The structure of claim 12, and the second power means comprising an extensible and retractable cylinder-piston unit having a piston rod connected with the bed and having a cylinder body pivoted to said undercarriage coaxially with the rotational axes of said additional pair of guide and support rollers.

14. A trailer for transporting, launching and retrieving boats comprising a wheeled undercarriage adapted for connection with a towing vehicle, a boat supporting bed mounted on said undercarriage for pivotal movement vertically and for longitudinal fore and aft movement relative to the undercarriage, guide roller means on the undercarriage engaged with trackway means of said bed and forming simultaneously the pivot point for the bed with the undercarriage and the means for guiding the bed in its fore and aft longitudinal movement, a first power cylinder having a pivotal connection with the undercarriage adjacent the rotational axis of said guide roller means whereby said cylinder may swing vertically in unison with the bed relative to the undercarriage, said first power cylinder having an extensible and retractable piston rod coupled to the bed for moving it fore and aft longitudinally, power-operated means connected with the bed to swing it vertically about said guide roller means in any longitudinally adjusted position of the bed, said power-operated means comprising a second power cylinder having a pivotal connection with the undercarriage and having an extensible and retractable piston rod, pivoted crank means on the undercarriage coupled with the last-named piston rod, and guide roller means on the pivoted crank means engaged with said trackway means of said bed, and a winch means on the trailer adapted for connection with a boat to be drawn onto the bed or discharged therefrom.

15. The structure of claim 14, and said winch means comprising a power-operated cable winch on the forward portion of said bed, and a control console on the forward portion of said bed having individual manual controls for said first and second power cylinders and said power winch, whereby such components may be independently remotely controlled by a single operator standing on said bed.

16. The structure of claim 14, and a power-operated guide arm means on said bed near the rearward end thereof for guiding a boat as the boat is being drawn onto said bed during a retrieval procedure.

17. The structure of claim 16, and said last-named power-operated means comprising a pair of laterally spaced guide arms having a pivotal connection with the bed, and a power cylinder on the bed operatively connected with a crank element of said guide arms so that the latter may be swung from stored to active positions.

18. The structure of claim 14, and a cradle support means for said first power cylinder slidably engaging said cylinder and being secured to said bed and movable with the bed relative to the first power cylinder, whereby the latter will be supported and properly aligned relative to the bed in all adjusted positions of the bed.

* * * * *